United States Patent [19]

Shiobara et al.

[11] Patent Number: 5,358,980
[45] Date of Patent: Oct. 25, 1994

[54] NAPHTHOL NOVOLAC EPOXY RESIN COMPOSITIONS AND SEMICONDUCTOR DEVICES ENCAPSULATED THEREWITH

[75] Inventors: Toshio Shiobara, Annaka; Kazutoshi Tomiyoshi, Takasaki, both of Japan

[73] Assignee: Shin-Etsu Chemical Company, Limited, Tokyo, Japan

[21] Appl. No.: 181,540

[22] Filed: Jan. 14, 1994

Related U.S. Application Data

[63] Continuation-in-part of Ser. No. 955,251, Oct. 1, 1992, abandoned.

[30] Foreign Application Priority Data

Oct. 3, 1991 [JP] Japan .................. 3-283548

[51] Int. Cl.$^5$ .............. C08L 61/06; C08L 61/08; C08L 61/12; C08K 3/22; C08K 3/28
[52] U.S. Cl. .................. 523/427; 523/457; 523/466; 525/481; 525/482; 525/501
[58] Field of Search .......... 523/427, 457, 466; 525/481, 482, 501

[56] References Cited

U.S. PATENT DOCUMENTS

| | | | |
|---|---|---|---|
| 5,043,102 | 8/1991 | Chen | 523/428 |
| 5,096,762 | 3/1992 | Yoshida | 523/440 |
| 5,155,202 | 10/1992 | Morita | 528/97 |

FOREIGN PATENT DOCUMENTS

| | | |
|---|---|---|
| 429667 | 5/1991 | European Pat. Off. |
| 251419 | 10/1988 | Japan |
| 321627 | 1/1991 | Japan |
| 339323 | 2/1991 | Japan |
| 343412 | 2/1991 | Japan |
| 359020 | 3/1991 | Japan |
| 163128 | 7/1991 | Japan |

*Primary Examiner*—John C. Bleutge
*Assistant Examiner*—D. R. Wilson
*Attorney, Agent, or Firm*—Birch, Stewart, Kolasch & Birch

[57] ABSTRACT

A thermosetting resin composition comprising (A) a naphthalene ring-bearing epoxy resin containing 1 to 10% by weight of a glycidyl naphthol derivative, (B) a naphthalene ring-bearing phenolic resin containing 1 to 10% by weight of a naphthol derivative, and (C) an inorganic filler wherein the content of the naphthol derivatives is 1 to 5% by weight based on the total resin components is suitable for encapsulating semiconductor devices since the composition has a good moldability and cures into a product having a low coefficient of expansion, heat resistance and low moisture absorption.

2 Claims, No Drawings

NAPHTHOL NOVOLAC EPOXY RESIN COMPOSITIONS AND SEMICONDUCTOR DEVICES ENCAPSULATED THEREWITH

This application is a continuation-in-part of copending application Ser. No. 07/955,251 filed on Oct. 1, 1992, abandoned, the entire content of which are hereby incorporated by reference.

FIELD OF THE INVENTION

This invention relates to thermosetting resin compositions having improved flow and moldability and curing into products having a low coefficient of expansion, a high glass transition temperature, heat resistance and low moisture absorption and semiconductor devices encapsulated with cured products of the thermosetting resin compositions.

BACKGROUND OF THE INVENTION

The mainstream of the modern semiconductor industry involves resin encapsulated diodes, transistors, IC, LSI, and super LSI. Among various resin compounds for encapsulating semiconductor devices, epoxy resin compositions are in most popular use because they are generally improved in moldability, adhesion, electrical properties, mechanical properties and moisture resistance over the rest of thermosetting resins. The present day trend for these semiconductor devices is toward an increasingly high degree of integration and increased chip size therewith. Packages, on the other hand, are desired to be smaller and thinner in outer dimensions to meet the demands of compactness and light weight for electronic equipment. Further, as to the attachment of semiconductor parts on circuit boards, surface mounting of semiconductor parts is now often employed for the reasons of increased part density on boards and reduced board thickness.

A common approach to the surface mounting of semiconductor parts is to dip entire semiconductor devices in a solder bath or to pass them through a hot zone of molten solder. Thermal shocks associated with this process cause encapsulating resin layers to crack or incur separation at the interface between the lead frames or chips and the encapsulating resin. Such cracks and separation become more outstanding if the semiconductor device encapsulating resin layers have absorbed moisture prior to thermal shocks encountered during surface mounting. Since encapsulating resin layers, however, inevitably absorb moisture in practical manufacturing steps, epoxy resin-encapsulated semiconductor devices after mounting sometimes suffer from a loss of reliability.

SUMMARY OF THE INVENTION

The present invention has been made to overcome the above-mentioned problems of the prior art, and its object is to provide a new and improved thermosetting resin composition exhibiting improved flow behavior and moldability and curing into products featuring a low coefficient of expansion, low stresses, a high glass transition temperature (Tg), heat resistance, and low moisture absorption.

Another object is to provide a semiconductor device encapsulated with a cured product of the thermosetting resin composition which remains fully reliable against moisture and thermal shocks during surface mounting.

The present invention is directed to a thermosetting resin composition comprising (A) a naphthalene ring-bearing epoxy resin, (B) a naphthalene ring-bearing phenolic resin, and (C) an inorganic filler. We have found that by using a naphthalene ring-bearing epoxy resin containing 1% to 10% by weight of a compound or naphthol derivative of the following formula (1) as component (A) and a naphthalene ring-bearing phenolic resin containing 1% to 10% by weight of a compound or naphthol derivative of the following formula (2) as component (B) and limiting the content of the compounds of formulae (1) and (2) to 1% to 5% by weight based on the total resin components, there is obtained a thermosetting resin composition which flows, shows an excellent moldability and adheres well, and cures into a product featuring a low coefficient of expansion, a high glass transition temperature (Tg), heat resistance and low moisture absorption. The composition is moldable over semiconductor devices. The semiconductor devices encapsulated with cured products of the composition are highly reliable.

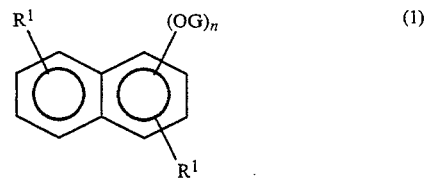

(1)

$R^1$ is a hydrogen atom or an alkyl group having 1 to 6 carbon atoms, OG is a glycidyl group, letter n is equal to 1 or 2, and the $R^1$ and OG groups may be attached to either one ring or both rings of the naphthalene ring.

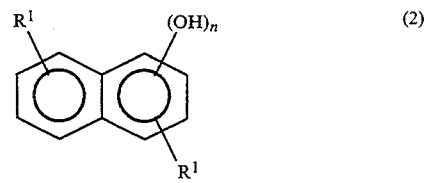

(2)

$R^1$ is a hydrogen atom or an alkyl group having 1 to 6 carbon atoms, letter n is equal to 1 or 2, and the $R^1$ and OH groups may be attached to either one ring or both rings of the naphthalene ring.

In particular, epoxy resin compositions using naphthalene ring-bearing epoxy resins and/or naphthalene ring-bearing phenolic resins are disclosed in a number of patent publications, for example, Japanese Patent Application Kokai (JP-A) No. 43412/1991, 21627/1991, 59020/1991 and 39323/1991. These compositions are based on naphthalene ring-bearing epoxy or phenolic resins and offer advantageous characteristics which are not found in prior art thin package encapsulating resins.

Since conventional naphthalene ring-bearing epoxy and phenol resins are prepared by starting with α-naphthol, α,β-naphthol or β,β-naphthol derivatives, a considerable amount of unreacted naphthol derivatives remain in the resulting epoxy and phenol resins. When semiconductor devices were encapsulated with epoxy resin compositions based on such epoxy or phenol resins having a considerable amount of unreacted reactants left therein, some devices became detrimental in high-temperature storage and moisture tests. We have found that this problems can be substantially overcome by limiting the content of naphthol derivatives of formulae (1) and (2) in the epoxy and phenol resins to 1% to 5% by weight in the epoxy resin compositions. Encapsulation with the presently formulated composition in cured state presents semiconductor devices of quality.

Therefore, it was found that the naphthalene ring-bearing epoxy and phenol resins are purified, for example, by distillation in order to remove the naphthol derivatives of formulae (1) and (2). However, unexpectedly, when the naphthalene ring-bearing epoxy and phenol resins are too purified and the thermosetting resin compositions contain less than 1% by weight of the naphthol derivatives of formulae (1) and (2), the moldability of the resulting epoxy resin compositions is extremely inferior. It was unexpectedly found that the thermosetting resin compositions should not be highly pure but should contain 1% by weight or more of the naphthol derivatives of formulae (1) and (2) from the viewpoint of moldability of the compositions.

Accordingly, the present invention provides a thermosetting resin composition comprising (A) a naphthalene ring-bearing epoxy resin having the general formula

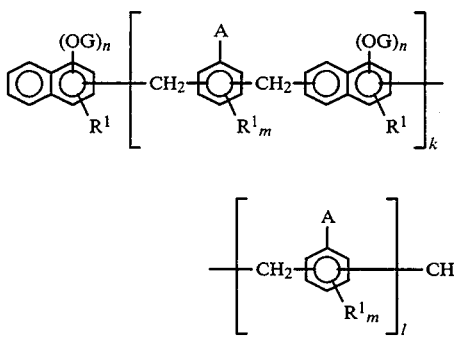

wherein $R^1$ is a hydrogen atom or an alkyl group having 1 to 6 carbon atoms, OG is a glycidyl group, n is equal to 1 or 2, the $R^1$ and OG groups may be attached to either one ring or both rings of the naphthalene ring, A is a hydrogen atoms or

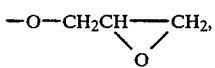

k is an integer of from 0 to 5, l is an integer of from 0 to 3, and m is an integer of from 0 to 2, wherein said naphthalene ring-bearing epoxy resin contains 1% to 10% by weight of a compound of the following formula (1):

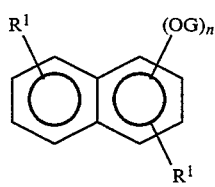

wherein $R^1$ is a hydrogen atom or an alkyl group having 1 to 6 carbon atoms, OG is a glycidyl group, n is equal to 1 or 2, and the $R^1$ and OG groups may be attached to either one ring or both rings of the naphthalene ring, (B) a naphthalene ring-bearing phenolic resin having the general formula

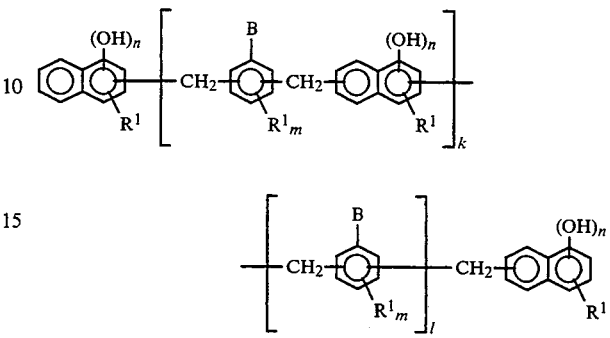

wherein $R^1$ is a hydrogen atom or an alkyl group having 1 to 6 carbon atoms, OG is a glycidyl group, n is equal to 1 or 2, the $R^1$ and OG groups may be attached to either one ring or both rings of the naphthalene ring, B is a hydrogen atom or OH, k is an integer of from 0 to 5, l is an integer of from 0 to 3, and m is an integer of from 0 to 2, wherein said naphthalene ring-bearing phenolic resin contains 1% to 10% by weight of a compound of the following formula (2):

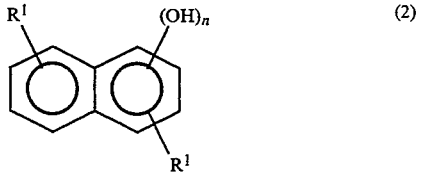

wherein $R^1$ is a hydrogen atom or an alkyl group having 1 to 6 carbon atoms, n is equal to 1 or 2, and the $R^1$ and OH groups may be attached to either one ring or both rings of the naphthalene ring, and (C) an inorganic filler selected from the group consisting of silica, crystalline silica, alumina, silicon nitride and aluminum nitride, in an amount from 200 to 1000 parts by weight per 100 parts by weight of the total resin components, wherein the combined content of the compounds of formulae (1) and (2) is 1 to 5% by weight based on the total resin components, the content of the epoxy resin (A) and phenolic resin (B) is 30 to 100 parts by weight of phenolic resin (B) per 100 parts by weight of epoxy resin (A), and the equivalent ratio of epoxy to hydroxy group is from 0.5 to 2.

DETAILED DESCRIPTION OF THE INVENTION

The present invention addresses to a thermosetting resin composition comprising (A) a naphthalene ring-bearing epoxy resin, (B) a naphthalene ring-bearing phenolic resin, and (C) an inorganic filler.

Component (A) is a naphthalene ring-bearing epoxy resin having the following general formula (3).

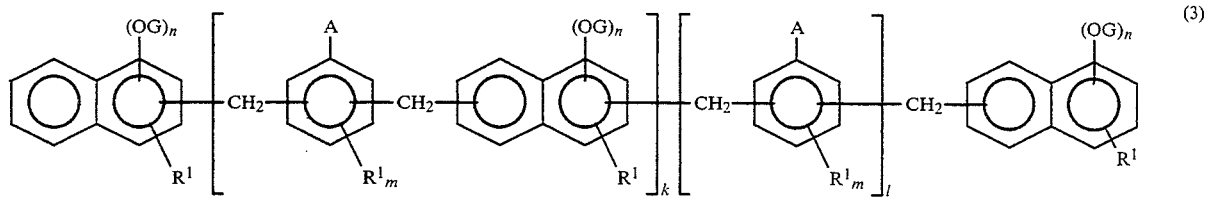

In formula (3), $R^3$ is a hydrogen atom or an alkyl group having 1 to 6 carbon atoms, such as methyl, ethyl, and butyl groups, OG is a glycidyl group represented by

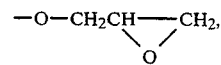

A is a hydrogen atom or $$-O-CH_2CH-CH_2,$$
$$\phantom{-O-CH_2CH}\underset{O}{\diagdown\diagup}$$

letter k is an integer of from 0 to 5, l is an integer of from 0 to 3, m is an integer of from 0 to 2, and n is equal to 1 or 2. When n is equal to 1, the OG group may be attached to either ring of the naphthalene ring. When n is equal to 2, the two OG groups may be attached to either one ring or both rings of the naphthalene ring.

Illustrative, non-limiting examples of the epoxy resin having a naphthalene ring are given below.

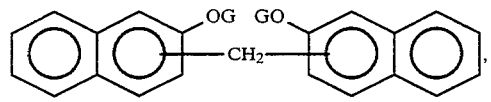

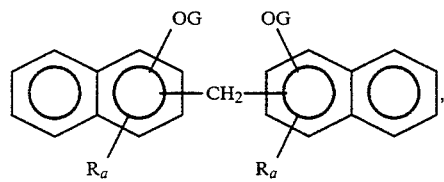

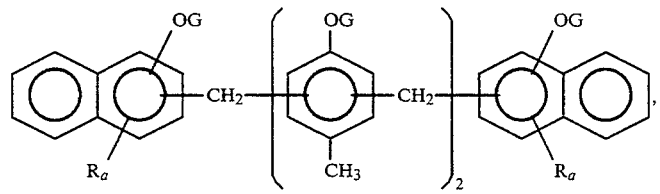

(I)

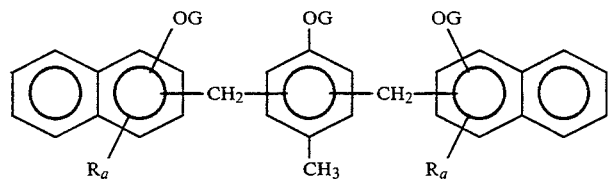

(II)

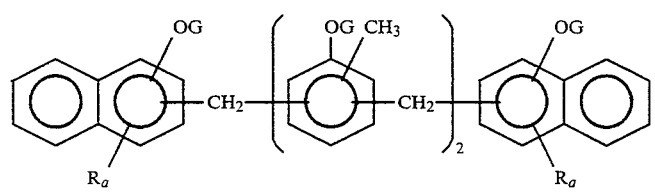

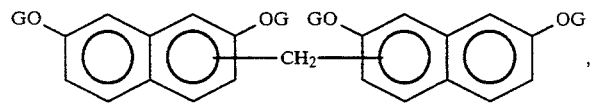

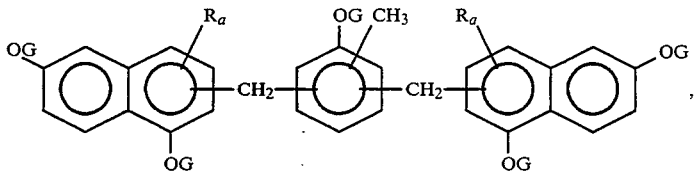

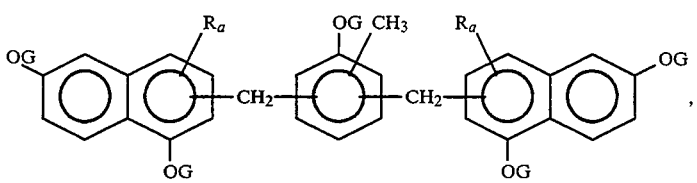

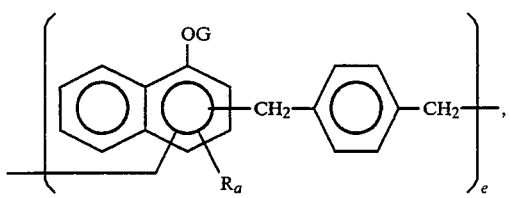

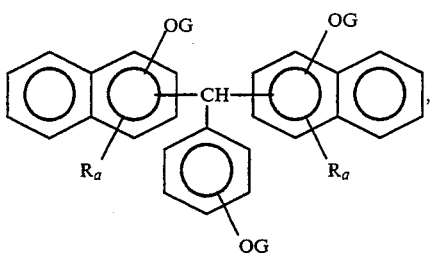

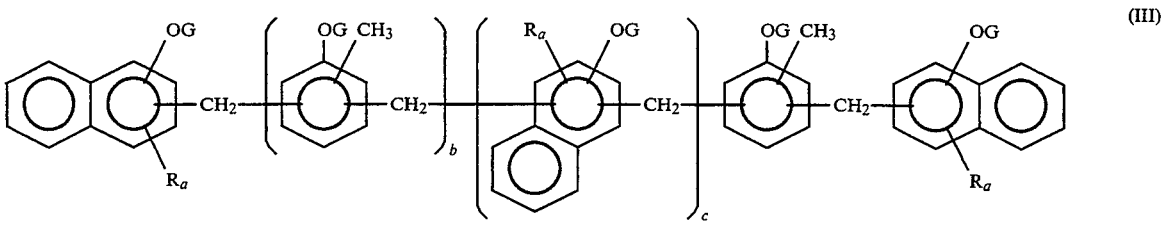

Among them, the compounds (I) to (III) are most preferred.

In the formulae, R is hydrogen or a monovalent hydrocarbon group having 1 to 5 carbon atoms, OG is

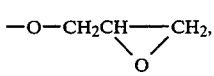

letter a is equal to 1 or 2, b, c, d, and e each are an integer of at least 2.

According to the present invention, the naphthalene ring-bearing epoxy resin should be one in which the content of a compound or naphthol derivative of formula (1) is 1% to 10% by weight.

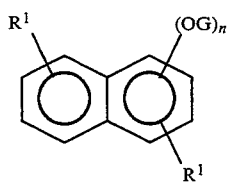

In formula (1), $R^1$ is a hydrogen atom or an alkyl group having 1 to 6 carbon atoms, such as methyl, ethyl and propyl groups, OG is a glycidyl group, and letter n is equal to 1 or 2. The $R^1$ and OG groups may be attached to either one ring or both rings of the naphthalene ring.

Examples of the formula (1) compound are given below.

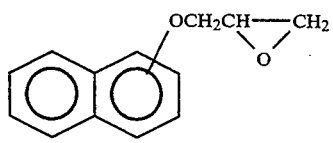

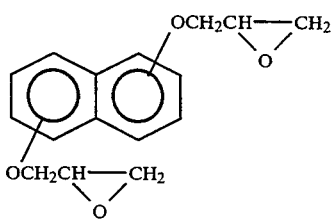

The naphthalene ring-bearing epoxy resin (A) should contain 1% to 10% by weight, preferably 1% to 7% by weight, more preferably 1 to 5% by weight of a formula (1) compound in view of heat resistance and moisture resistance. If the content of a formula (1) compound exceeds 10% by weight, the resulting composition has a lower Tg and semiconductor devices encapsulated therewith show a substantial variation of electrical resistance, fail to maintain their initial characteristics, and sometimes experience open circuits in a high-temperature, long-term test. Apart from the formula (1) compound, the contents of a binuclear compound consisting of phenols and phenylglycidyl ether each are preferably up to 1% by weight, especially up to 0.5% by weight.

Desirably, the naphthalene ring-bearing epoxy resin (A) has a softening point, which is affected by the content of a formula (1) compound, of from 50° to 120° C., especially from 70° to 110° C. and an epoxy equivalent of 100 to 400. An epoxy resin having a softening point of lower than 50° C. has the drawbacks that cured products have too low Tg and molding of the composition is frequently accompanied by burrs and voids. With a softening point in excess of 120° C., the composition would become too viscous to mold.

In the preferred embodiment wherein the composition is used for semiconductor encapsulation, epoxy resin (A) should preferably contain less than 1,000 ppm, especially less than 500 ppm of hydrolyzable chlorine, and less than 10 ppm of sodium and potassium. If a semiconductor device is encapsulated with a resin containing more than 1,000 ppm of hydrolyzable chlorine and more than 10 ppm of sodium and potassium, it would lose moisture resistance when allowed to stand in a high-temperature, high-humidity atmosphere for a long time. By selecting the epoxy resin in accordance with more of these requirements, there is obtained an epoxy resin composition which is more reliable.

An essential epoxy resin used in the thermosetting resin composition of the present invention is a naphthalene ring-containing epoxy resin as defined above while any conventional epoxy resin may be additionally used. Typical of the additional epoxy resin are epoxy resins having at least two epoxy groups in a molecule, for example, bisphenol-A type epoxy resins, phenol novolak type epoxy resins, triphenol alkane type epoxy resins and polymers thereof, dicyclopentadiene-modified phenol type epoxy resins, phenol aralkyl type epoxy resins, glycidyl ester type epoxy resins, cycloaliphatic epoxy resins, heterocyclic epoxy resins, and brominated epoxy resins, Preferably, the total content of naphthalene ring in the epoxy resins ranges from 5 to 80% by weight, especially from 10 to 60% by weight. It is thus preferred to control the amounts of the naphthalene ring-containing epoxy resin and other epoxy resin so as to provide such a total naphthalene content.

Component (B) is a naphthalene ring-bearing phenolic resin having the following general formula (4).

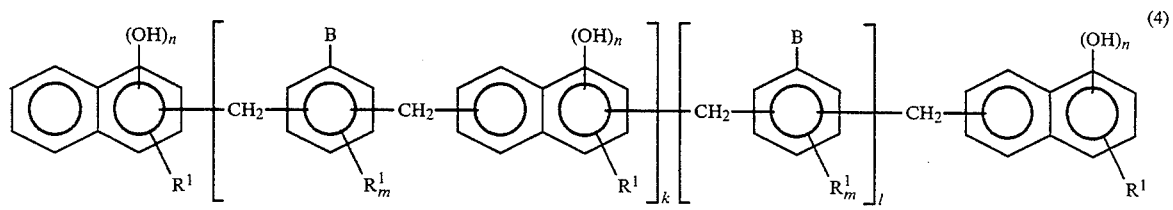

In formula (4), $R^1$ is a hydrogen atom or an alkyl group having 1 to 6 carbon atoms, such as methyl, ethyl and butyl groups, B is a hydrogen atom or —OH, letter k is an integer of from 0 to 5, l is an integer of from 0 to 3, m is an integer of from 0 to 2, and n is equal to 1 or 2. When n is equal to 1, the OH group may be attached to either ring of the naphthalene ring. When n is equal to 2, the to OH groups may be attached to either one ring or both rings of the naphthalene ring.

Illustrative, non-limiting examples of the phenolic resin having a naphthalene ring are given below.

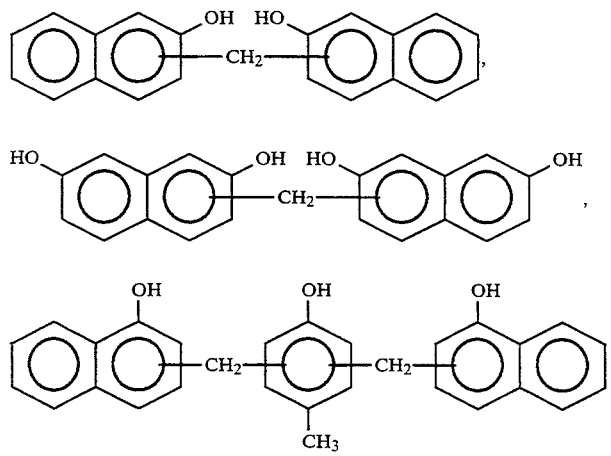

(IV)

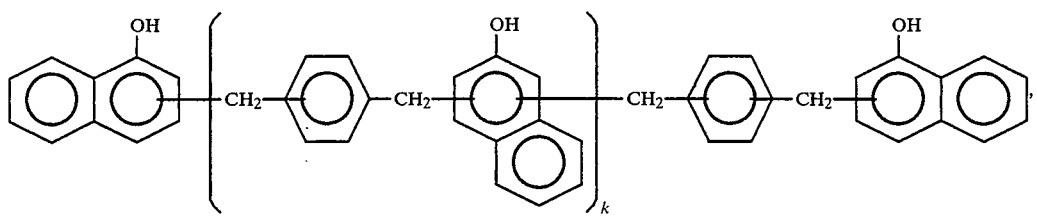

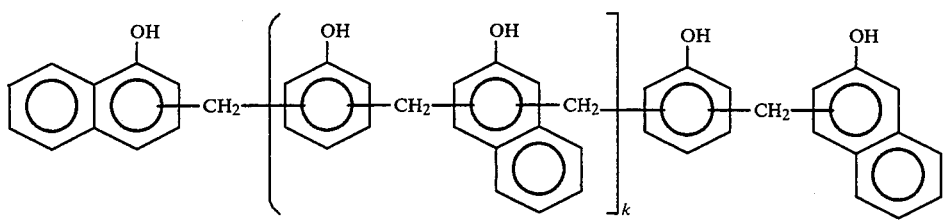

(V)

Among them, the compounds (IV) and (V) are most preferred.

In the formulae, k is as defined above.

The naphthalene ring-bearing phenolic resin (B) used herein serves as a curing agent for component (A) or epoxy resin and should be one in which the content of a compound or naphthol derivative of formula (2) is 1% to 10% by weight.

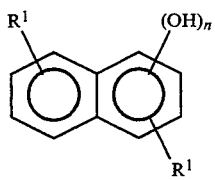
(2)

In formula (2), $R^1$ is a hydrogen atom or an alkyl group having 1 to 6 carbon atoms, such as methyl, ethyl and propyl groups, and letter n is equal to 1 or 2. The $R^1$ and OH groups may be attached to either one ring or both rings of the naphthalene ring.

Examples of the formula (2) compound are given below.

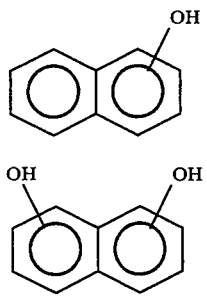

The naphthalene ring-bearing phenolic resin (B) should contain 1% to 10% by weight, preferably 1% to 7% by weight, more preferably 1 to 5% by weight of a formula (2) compound. Although most thermosetting resin compositions using a phenolic resin of formula (4) are effective in improving crack resistance upon solder immersion after moisture absorption and lowering moisture absorption, a thermosetting resin composition using a phenolic resin containing more than 10% by weight of a naphthol derivative of formula (2) as the curing agent has the problem that semiconductor devices encapsulated therewith experience substantial losses of heat resistance and moisture resistance.

Apart from the naphthol derivative, the contents of a binuclear phenol compound and a free phenol each are preferably up to 1% by weight, especially up to 0.5% by weight.

Desirably, the naphthalene ring-bearing phenolic resin (B) has a softening point, which is affected by the content of a formula (2) compound, of from 60° to 150° C., especially from 70° to 130° C. and a hydroxyl equivalent of 90 to 250.

In the preferred embodiment wherein the composition is used for semiconductor encapsulation, phenolic resin (B) should preferably contain less than 10 ppm of sodium and potassium. If a semiconductor device is encapsulated with a resin containing more than 10 ppm of sodium and potassium and allowed to stand in a high-temperature, high-humidity atmosphere for a long time, the alkali contents can promote deterioration of moisture resistance.

In the thermosetting resin composition of the invention, the above-defined naphthalene ring-bearing phenolic resin is an essential component while other phenolic resins may be blended in combination. Examples of the other phenolic resin which can be used herein include phenolic resin having at least two phenolic hydroxyl groups in a molecule, such as novolak type phenolic resins, resol type phenolic resins, phenol aralkyl resins, triphenol alkane type resins and polymers thereof, and dicyclopentadiene-modified phenolic resins, as well as other cuing agents such as amine curing agents and acid anhydride curing agents.

Preferably, the total content of naphthalene ring in the phenolic resins ranges from 5 to 80% by weight, especially from 10 to 60% by weight. It is thus preferred to control the amounts of the naphthalene ring-containing phenolic resin and other phenolic resin so as to provide such a total naphthalene content.

According to the present invention, the content of the compounds of formulae (1) and (2) is limited to 1 to 5%, preferably 1.5 to 5%, more preferably 2.0 to 4.8% based on the entire resin weight, that is, epoxy resins plus phenolic resins. It is thus necessary to control the amounts of epoxy resin (A) and phenolic resin (B) so as to meet this requirement. If the content of the compounds of formulae (1) and (2) combined exceeds 5% by weight, the resulting composition has a lower Tg and semiconductor devices encapsulated therewith are susceptible to defects known as purple plague in a high temperature test and lose moisture resistance. If the content of the compounds of formulae (1) and (2) combined is less than 1% by weight, the thermosetting resin composition is extremely inferior in moldability, resulting in the occurrence of pinholes to the cured resin encapsulating a semiconductor device. Particularly, when a thin package such as TSOP (thin small outline package) is encapsulated with the composition containing less than 1% by weigh of the compounds of formulae (1) and (2), no encapsulated portions or pinholes occur especially at the back surface of the thin package because such a composition has a high viscosity and a low flowability.

The blending ratio of the epoxy and phenolic resins depends on the equivalent ratio of epoxy to hydroxyl group. Desirably, the equivalent ratio of epoxy group to hydroxyl group ranges from 0.5 to 2, especially from 0.8 to 1.5. Accordingly, about 30 to 100 parts, especially about 40 to 70 parts by weight of the phenolic resin is preferably used per 100 parts by weight of the epoxy resin. On this basis, less than 30 parts of the phenolic resin would provide less satisfactory strength whereas if the phenolic resin is more than 100 parts, part of the phenolic resin would be left unreacted, resulting in a loss of moisture resistance.

In the practice of the invention, a silicone-modified copolymer is preferably blended in addition to naphthalene ring-bearing epoxy resin (A) and naphthalene ring-bearing phenolic resin (B) for enhancing the benefits of the invention. The silicone-modified copolymers which can be used herein include copolymers resulting from addition reaction of epoxy and phenol resins containing an alkenyl group or naphthalene ring-bearing epoxy and phenol resins containing an alkenyl group to organopolysiloxanes, in particular SiH groups thereof, The following are examples of the epoxy and phenol resins containing an alkenyl group or naphthalene ring-bearing epoxy and phenol resins containing an alkenyl group,

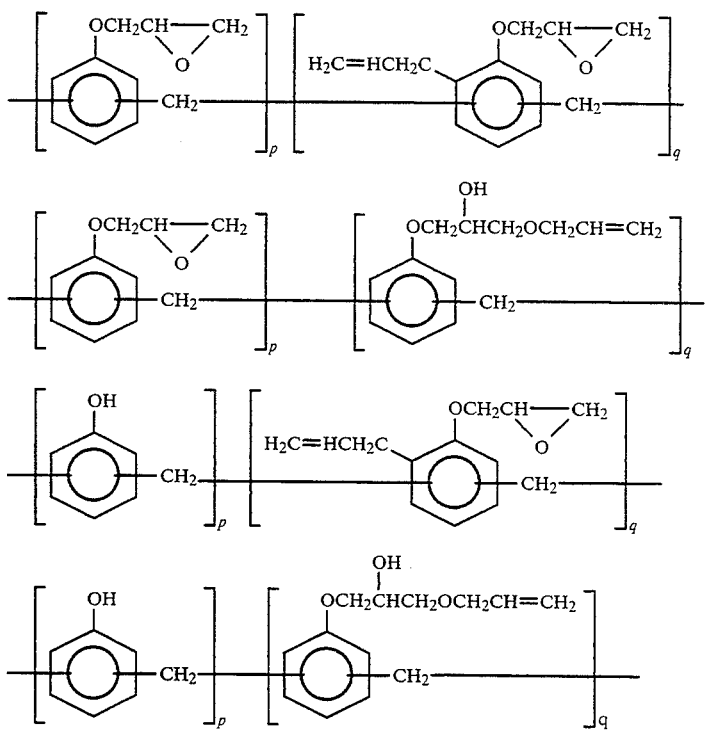

The organopolysiloxanes to be reacted with the foregoing resins have the following structure, for example,

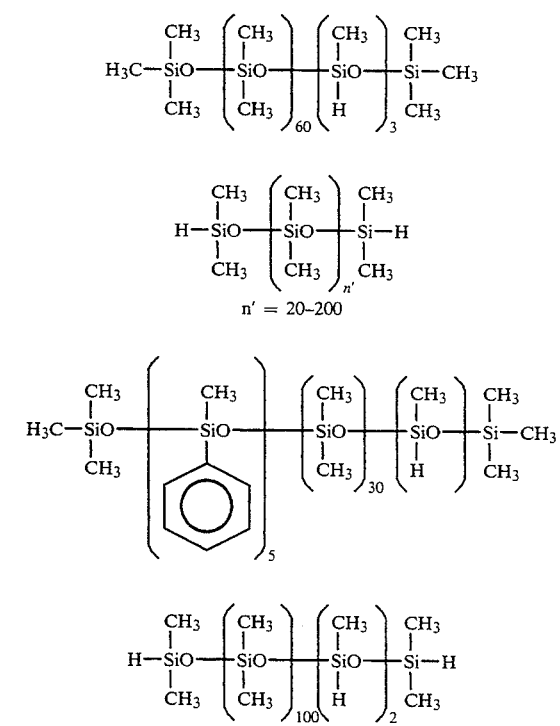

-continued

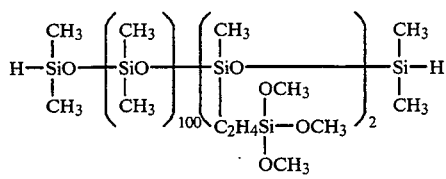

In the composition, the silicone-modified copolymer is preferably blended in amounts of 0 to 50 parts, especially 1 to 30 parts by weight per 100 parts by weight of naphthalene ring-bearing epoxy resin (A) and naphthalene ring-bearing phenolic resin (B) combined. More than 50 parts by weight on this basis of the copolymer would rather adversely affect adhesion and provide cured products having a sufficiently high coefficient of water diffusion to allow for water permeation.

Component (C) is an inorganic filler which may be selected from those commonly used for epoxy resins. The inorganic filler is effective for reducing the coefficient of expansion of the encapsulant for reducing stresses to semiconductor elements. Fused silica in ground and spherical forms and crystalline silica are often used as the inorganic filler. Alumina, silicon nitride, and aluminum nitride are also useful. The filler should preferably have a mean particle size of about 5 to 20 $\mu$m. It is recommended to use only a spherical filler or a blend of spherical and ground forms in order to achieve both moldability and the low expansion of cured products. The filler is preferably surface treated with silane coupling agents prior to blending in order to enhance the interfacial strength between the resin and the filler.

The inorganic filler is preferably used in an amount of about 200 to about 1,000 parts, especially about 250 to about 700 parts by weight per 100 parts by weight of the total resin components in the composition. On this basis, less than 200 parts of the filler would be too small to accomplish its purposes of reducing a coefficient of expansion and thus reducing stresses to semiconductor elements for preventing deterioration of the elements. Blending more than 1,000 parts of the filler would provide the composition with a too high viscosity to mold.

Additionally, a curing promoter (D) may be added to the composition of the invention. Typical curing promoters are imidazole and its derivatives, phosphine derivatives, and cycloamidine derivatives. Preferably the curing promoter is blended in amounts of 0.001 to 5 parts, especially 0.1 to 2 parts by weight per 100 parts by weight of epoxy resin (A). Less than 0.001 parts of the curing promoter is too small to complete curing within a short time whereas more than 5 parts of the promoter can accelerate the curing rate too fast to form an acceptable molding.

In certain preferred embodiments of the invention, various organic synthetic rubbers, thermoplastic resins such as styrene-butadiene-methyl methacrylate copolymers and styrene-ethylene-butene-styrene copolymers, silicone gel, and silicone rubber in fine powder form may be added for imparting flexibility and toughness to cured products of the thermosetting resin composition. The inorganic filler may be surface treated with a two part type silicone rubber or silicone gel. Among others, the silicone-modified copolymers mentioned above and styrene-butadiene-methyl methacrylate copolymers are effective for reducing the stresses of the cured product.

Preferably, the thermoplastic resin acting as a stress relieving agent is blended in amount of about 0.5 to 10% by weight, especially about 1 to 5% by weight based on the overall thermosetting resin composition. The thermoplastic resin would provide insufficient thermal shock resistance in amounts of less than 0.5% by weight and low mechanical strength in amounts of more than 10% by weight.

If desired, the composition of the invention may further contain mold release agents such as carnauba wax, higher fatty acids and synthetic wax, silane coupling agents, antimony oxide and phosphorous compounds.

The composition of the invention may be prepared by melting and milling the components in a hot roll mill, melting and kneading in a kneader or melting and masticating in a continuous extruder. The order of mixing the components is not critical.

The thermosetting resin compositions of the invention are advantageously applicable in encapsulating various types of semiconductor devices including dual-in-line package (DIP), flat package, plastic leaded chip carrier (PLCC) and small outline (SO) types. The compositions can be molded by conventional methods including transfer molding, injection molding, and casting. Most often, the compositions are molded at a temperature of about 150° to about 180° C. and post cured at a temperature of about 150° to about 185° C. for about 2 to about 16 hours.

It is apparent from the above that the thermosetting resin compositions according to the present invention exhibit improved flow behavior and cure into products featuring a low coefficient of expansion, a high Tg, heat resistance, and low moisture absorption. Semiconductor devices encapsulated with cured products of the compositions remain fully reliable.

EXAMPLE

Examples of the present invention are given below together with Comparative Examples, by way of illustration and not by way of limitation. All parts are by weight.

Examples 1–4 and Comparative Examples 1–5

Thermosetting resin compositions were prepared by uniformly melt mixing the following components in a hot two-roll mill. The components used were a naphthalene ring-bearing epoxy resin, a naphthalene ring-bearing phenol resin, a brominated epoxy resin, all shown below and used in the amounts shown in Table 1, 550 parts of spherical silica, 10 parts of antimony trioxide, 1.5 parts of $\gamma$-glycidoxypropyl-trimethoxysilane, 1.5 parts of wax E, 1.0 parts of carbon black, and 0.8 parts of triphenylphosphine.

For these compositions, the following tests (A) to (F) were carried out. The results are shown in Table 1.

(A) Spiral flow

Using a mold according to the EMMI standard, measurement was made at 175° C. and 70 kg/cm².

(B) Flexural strength and Flexural modulus

Test bars of 10×100×4 mm which were molded at 175° C. and 70 kg/cm² for 2 minutes and post cured at 180° C. for 4 hours were tested according to JIS K6911.

(C) Glass transition temperature (Tg) and Coefficient of linear expansion ($\mu$)

Test pieces of 4×4×15 mm which were molded at 175° C. and 70 kg/cm² for 2 minutes and post cured at 180° C. for 4 hours were examined by means of a dilatometer by heating the test pieces at a rate of 5° C./min.

(D) Moisture take-up, Crack resistance upon soldering after moisture absorption, and Moisture resistance.

Semiconductor devices for an aluminum conductor corrosion evaluating moisture test were encapsulated to flat packages of 2 mm thick by molding a composition around the devices at 175° C. and 70 kg/cm² for 2 minutes and post curing at 180° C. for 4 hours. The packages were maintained in a hot humid atmosphere at 85° C. and RH 85% for 120 hours, allowing the packages to take up moisture. The moisture take-up was measured. Thereafter, the packages were immersed for 10 seconds in a solder bath at 260° C. Then the packages were observed for cracks. Reported is the number of cracked packages/the total number of packages tested. Only the intact packages were then maintained in a saturated steam atmosphere at 120° C. for a predetermined time and the percentage of defective packages was calculated.

(E) Heat resistant reliability

Integrated circuits were prepared by bonding silicon chips having aluminum conductors to 42 alloy frames having 14 pins with an epoxy resin and interconnecting the leads and the aluminum conductors through gold conductors. The circuits were encapsulated with a thermosetting resin composition by molding at 175° C. for 2 minutes and post curing at 180° C. for 5 hours. The circuits were allowed to stand at 200° C. for 500 hours and measured for resistance. Those circuits in which the resistance increased to 10 Ω or more due to an intermetallic compound created at the gold-aluminum junction were rejected. The percentage of rejected samples was calculated.

(F) Moldability

TSOP (thin small outline package) having 28 pins were encapsulated by transfer molding a composition around the package at 175° C. and 70 kg/cm² for 2 minutes and post curing at 180° C. for 4 hours. The appearance of the encapsulated packages were visually observed and the number of defective packages which have pinholes at the back portion opposite to the die pad was counted. The sample numbers are 12 for each composition.

TABLE 1

|  | E1 | E2 | E3 | E4 | CE1 | CE2 | CE3 | CE4 | CE5 |
|---|---|---|---|---|---|---|---|---|---|
| Composition, pbw |  |  |  |  |  |  |  |  |  |
| Epoxy resin (1) | 54.1 | — | — | — | — | — | — | — | — |
| Epoxy resin (2) | — | 53.9 | — | — | 54.4 | — | — | — | — |
| Epoxy resin (3) | — | — | — | — | — | 54.6 | — | — | — |
| Epoxy resin (4) | — | — | 50.1 | — | — | — | — | — | — |
| Epoxy resin (5) | — | — | — | 49.9 | — | — | 50.4 | — | — |
| Epoxy resin (6) | — | — | — | — | — | — | — | 54.1 | — |
| Epoxy resin (7) | — | — | — | — | — | — | — | — | 54.1 |
| Phenol resin (1) | 35.9 | 36.1 | 39.9 | 40.1 | — | — | — | — | — |
| Phenol resin (2) | — | — | — | — | 35.6 | 35.4 | 39.6 | — | — |
| Phenol resin (3) | — | — | — | — | — | — | — | 35.9 | — |
| Phenol resin (4) | — | — | — | — | — | — | — | — | 35.9 |
| Brominated epoxy resin | 10 | 10 | 10 | 10 | 10 | 10 | 10 | 10 | 10 |
| Total amount of naphthol derivatives of formulae (1) and (2) | 2.3 | 4.5 | 2.8 | 4.3 | 6.3 | 8.5 | 6.3 | 0.8 | 0.1 |
| Properties |  |  |  |  |  |  |  |  |  |
| Spiral flow, cm | 60 | 61 | 72 | 75 | 62 | 65 | 76 | 48 | 38 |
| Flexural strength, kg/mm² | 14.5 | 15.0 | 15.0 | 14.8 | 14.0 | 14.5 | 14.2 | 15.0 | 14.8 |
| Flexural modulus, kg/mm² | 1850 | 1860 | 1830 | 1800 | 1840 | 1820 | 1820 | 1810 | 1880 |
| Tg, °C. | 165 | 163 | 167 | 165 | 145 | 142 | 140 | 168 | 170 |
| $\mu$ ($\times 10^{-50}$ C.) | 1.2 | 1.2 | 1.2 | 1.3 | 1.3 | 1.3 | 1.3 | 1.2 | 1.2 |
| Moisture take-up, % | 0.12 | 0.13 | 0.14 | 0.14 | 0.13 | 0.14 | 0.13 | 0.13 | 0.14 |
| Crack resistance | 0/10 | 0/10 | 0/10 | 0/10 | 3/10 | 6/10 | 5/10 | 0/10 | 1/10 |
| Defective packages after moisture test, % | 0 | 0 | 0 | 0 | 5 | 8 | 10 | 0 | 0 |
| Reliability, % | 0 | 0 | 0 | 0 | 7 | 7 | 13 | 0 | 0 |
| Moldability | 0/12 | 0/12 | 0/12 | 0/12 | 0/12 | 0/12 | 0/12 | 3/12 | 8/12 |

The epoxy and phenol resin used in the these examples are identified below.

| Resin |  | Equivalent | Naphthol derivative (wt %) |
|---|---|---|---|
| Epoxy resin (1) | 230 | 3 |  |
| Epoxy resin (2) | 228 | 7 |  |
| Epoxy resin (3) | 230 | 11 |  |
| Epoxy resin (6) | 230 | 0.9 |  |
| Epoxy resin (7) | 229 | 0.2 |  |

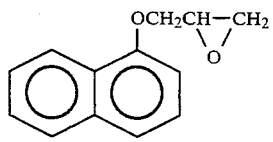

-continued

| Resin | Equivalent | Naphthol derivative (wt %) |
|---|---|---|
| Epoxy resin (4) | 189 | 4 |
| Epoxy resin (5) | 187 | 7 |
| Phenol resin (1) | 139 | 2 |
| Phenol resin (2) | 136 | 7 |
| Phenol resin (3) | 139 | 0.8 |
| Phenol resin (4) | 138 | 0.4 | total of naphthol derivatives (OCH₂CH—CH₂ with epoxide and CH₂CHCH₂O-naphthalene-OCH₂CH—CH₂) and naphthol (OH on naphthalene)

Brominated epoxy resin
(BREN—S by Nippon Kayaku K.K.)
280

Epoxy resins (1) to (3) and (6) to (7):

[Structure: naphthalene-OG — (CH₂—phenyl(CH₃)—CH₂—naphthalene-OG)ₙ — CH₂—phenyl(CH₃)—CH₂—naphthalene-OG]

OG: glycidyl group, n: 0 to 5
Epoxy resins (4) and (5):
Epoxy resins comprised of a main ingredient:

[Structure: naphthalene(OG)—CH₂—naphthalene(OG)(OG)]

Phenol resins (1) to (4):

[Structure: naphthalene-OH — (CH₂—phenyl(CH₃)(OH)—CH₂—naphthalene-OH)ₙ — CH₂—phenyl(CH₃)(OH)—CH₂—naphthalene-OH]

As is evident from the results of Table 1, the compositions containing more than 5% by weight of naphthol derivatives of formulae (1) and (2) in total give a cured product having inferior crack resistance, moisture resistance and reliability. The compositions containing less than 1% by weight of naphthol derivatives of formulae (1) and (2) in total have inferior moldability, resulting in pinholes upon molding package.

On the other hand, only the compositions containing 1 to 5% by weight of the naphthol derivatives of formulae (1) and (2) in total have excellent moldability and can mold thin small outline package which is known as a difficultly molding package without the occurrence of pinholes. Further, they can give a cured product having excellent crack resistance, moisture resistance and reliability.

We claim:

1. A thermosetting resin composition comprising
   (A) a naphthalene ring-bearing epoxy resin having the general formula

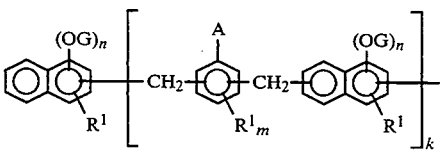

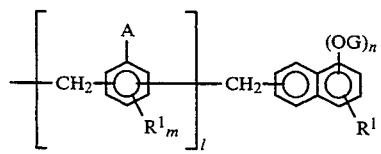

wherein $R^1$ is a hydrogen atom or an alkyl group having 1 to 6 carbon atoms, OG is a glycidyl group, n is equal to 1 or 2, the $R^1$ and OG groups may be attached to either one ring or both rings of the naphthalene ring, A is a hydrogen atoms or

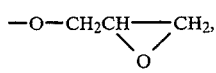

k is an integer of from 0 to 5, l is an integer of from 0 to 3, and m is an integer of from 0 to 2, wherein said naphthalene ring-bearing epoxy resin contains 1% to 10% by weight of a compound of the following formula (1):

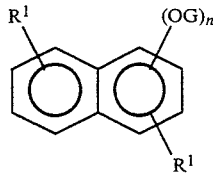

wherein $R^1$ is a hydrogen atom or an alkyl group having 1 to 6 carbon atoms, OG is a glycidyl group, n is equal to 1 or 2, and the $R^1$ and OG groups may be attached to either one ring or both rings of the naphthalene ring, (B) a naphthalene ring-bearing phenolic resin having the general formula

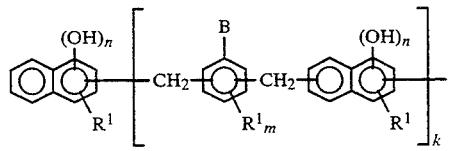

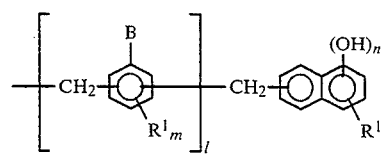

wherein $R^1$ is a hydrogen atom or an alkyl group having 1 to 6 carbon atoms, OG is a glycidyl group, n is equal to 1 or 2, the $R^1$ and OG groups may be attached to either one ring or both rings of the naphthalene ring, B is a hydrogen atom or OH, k is an integer of from 0 to 5, l is an integer of from 0 to 3, and m is an integer of from 0 to 2, wherein said naphthalene ring-bearing phenolic resin contains 1% to 10% by weight of a compound of the following formula (2):

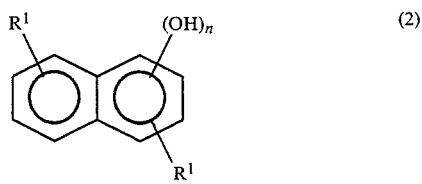

wherein $R^1$ is a hydrogen atom or an alkyl group having 1 to 6 carbon atoms, n is equal to 1 or 2, and the $R^1$ and OH groups may be attached to either one ring or both rings of the naphthalene ring, and (C) an inorganic filler selected from the group consisting of silica, crystalline silica, alumina, silicon nitride and aluminum nitride, in an amount from 200 to 1000 parts by weight per 100 parts by weight of the total resin components, wherein the combined content of the compounds of formulae (1) and (2) is 1 to 5% by weight based on the total resin components, the content of the epoxy resin (A) and phenolic resin (B) is 30 to 100 parts by weight of phenolic resin (B) per 100 parts by weight of epoxy resin (A), and the equivalent ratio of epoxy to hydroxyl group is from 0.5 to 2.

2. The thermosetting resin composition according to claim 1, wherein the equivalent ratio of epoxy to hydroxyl group is from 0.8 to 1.5, and the content of the epoxy resin (A) and phenolic resin (B) is 40 to 70 parts by weight of phenolic resin (B) per 100 parts by weight of epoxy resin (A).

* * * * *